US012090454B2

(12) United States Patent
Weber

(10) Patent No.: US 12,090,454 B2
(45) Date of Patent: Sep. 17, 2024

(54) ROTOR FOR A DEVICE FOR MIXING POWDER AND LIQUID AND DEVICE FOR MIXING POWDER AND LIQUID

(71) Applicant: YSTRAL GMBH MASCHINENBAU + PROCESSTECHNIK, Ballrechten-Dottingen (DE)

(72) Inventor: Bernd Weber, Sulzburg-Laufen (DE)

(73) Assignee: YSTRAL GMBH MASCHINENBAU + PROCESSTECHNIK, Ballrechten-Dottingen (DE)

( * ) Notice: Subject to any disclaimer, the term of this patent is extended or adjusted under 35 U.S.C. 154(b) by 637 days.

(21) Appl. No.: 17/423,883

(22) PCT Filed: Jan. 14, 2020

(86) PCT No.: PCT/EP2020/050824
§ 371 (c)(1),
(2) Date: Jul. 18, 2021

(87) PCT Pub. No.: WO2020/156805
PCT Pub. Date: Aug. 6, 2020

(65) Prior Publication Data

US 2022/0370970 A1 Nov. 24, 2022

(30) Foreign Application Priority Data

Feb. 1, 2019 (DE) ......................... 102019102583.4

(51) Int. Cl.
*B01F 27/00* (2022.01)
*B01F 23/53* (2022.01)
*B01F 27/271* (2022.01)

(52) U.S. Cl.
CPC .......... *B01F 27/2712* (2022.01); *B01F 23/53* (2022.01)

(58) Field of Classification Search
CPC ..... B01F 27/2712; B01F 23/53; B01F 27/115
See application file for complete search history.

(56) References Cited

U.S. PATENT DOCUMENTS 1,862,906 A 6/1932 Preleuthner
4,421,414 A * 12/1983 Holupko .............. B01F 23/233 261/93

(Continued)

FOREIGN PATENT DOCUMENTS

CN 105561854 B 2/2018
DE 3028920 A1 12/1982

(Continued)

OTHER PUBLICATIONS

PCT International Search Report (PCT/EP2020/050824), Date of Issuance: Apr. 21, 2020.

(Continued)

*Primary Examiner* — Anshu Bhatia
(74) *Attorney, Agent, or Firm* — Kevin R Erdman; Brannon Sowers & Cracraft PC

(57) ABSTRACT

In the case of a rotor (109) for a device for mixing powder and liquid, which device has a stator which interacts with the rotor (109), at least some shear blades (124) are of wedge-shaped form and are inclined with one face side (233) in a flow direction (239). This has the result, in the case of an effective diversion at side walls (227) situated at the front in a flow direction (239), of an intense shear action at the face sides (233) and of a relatively low risk of formation of deposits and adherent accumulations on the side walls (230) situated at the rear in the flow direction (239).

19 Claims, 5 Drawing Sheets

(56) References Cited

U.S. PATENT DOCUMENTS

| | | | | |
|---|---|---|---|---|
| 4,534,657 | A * | 8/1985 | Clement | B01F 27/115<br>366/328.2 |
| 6,770,207 | B1 * | 8/2004 | Takala | B01F 23/233<br>210/765 |
| 2003/0107950 | A1 * | 6/2003 | Shepherd | B01F 27/15<br>366/330.1 |
| 2014/0211585 | A1 * | 7/2014 | Maxon | B01F 27/115<br>366/279 |

FOREIGN PATENT DOCUMENTS

| | | | |
|---|---|---|---|
| DE | 29608713 | U1 | 8/1996 |
| EP | 2403632 | B1 | 3/2013 |
| EP | 2574396 | A1 | 4/2013 |
| EP | 0290033 | A1 | 7/2013 |
| EP | 2609998 | A1 | 7/2013 |

OTHER PUBLICATIONS

PCT International Preliminary Report on Patentability (PCT/EP2020/050824), Date of Issuance: Oct. 29, 2020.

* cited by examiner

ROTOR FOR A DEVICE FOR MIXING POWDER AND LIQUID AND DEVICE FOR MIXING POWDER AND LIQUID

This application is a National Stage filing of International PCT/EP2020/050824 filed Jan. 14, 2020, entitled "ROTOR FOR A DEVICE FOR MIXING POWDER AND LIQUID AND DEVICE FOR MIXING POWDER AND LIQUID", claiming priority to German Patent Application Serial Number 102019102583.4, filed Feb. 1, 2019, the disclosures of which are incorporated by reference herein.

BACKGROUND OF THE INVENTION

The invention relates to a rotor for a device for mixing powder and liquid according to the preamble of claim 1.

The invention also relates to a device for mixing powder and liquid with a rotor of this type.

A rotor and a device of this type are known from CN 105 561 854 B. The previously known rotor has, as a support structure, a support disk which is designed with a centrally arranged shaft receptacle. Furthermore, there is a number of substantially cuboid-shaped shear blades which extend in the axial direction and which are formed on the support disk and are arranged at a radial distance from the shaft receptacle and extend away from the support disk in the axial direction. The shear blades of this rotor are trapezoidal with two parallel outer side walls of different lengths and two front side walls, which are also of different lengths. The shear blades are used to generate high shear forces to promote mixing.

Another rotor of this type and a device equipped of this type are known from EP 3 069 786 A1. This rotor has, as a support structure, a support disk which is designed with a centrally arranged shaft receptacle. Furthermore, there is a number of substantially cuboid-shaped shear blades which extend in the axial direction and which are formed on the support disk and are arranged at a radial distance from the shaft receptacle and extend away from the support disk in the axial direction. The shear blades have two side walls extending in the direction of a central region. The shear blades are used to generate high shear forces to promote mixing.

From DE 296 08 713 U1, a dispersing device with a rotor is known which has lugs arranged in a ring and are designed in a trapezoidal shape. To optimize the shear surfaces, variable dimensions and opening angles of the lugs are suggested.

EP 2 403 632 B1 discloses a comminuting and dispersing device with a rotor and with a stator, the processing surfaces of which are opposite one another at an acute angle. The machining surfaces have a predetermined surface structure with a plurality of projections.

From U.S. Pat. No. 1,862,906 A, an agitator device has agitator blades with tooth-like elements which are arranged at an angle.

SUMMARY OF THE INVENTION

The invention is based on the object of specifying a rotor of the type mentioned at the beginning and a device equipped with such a rotor with particularly efficient mixing behavior.

In the case of a rotor of the type mentioned at the outset, this object is achieved according to the invention with the characterizing features of claim 1.

This object is achieved in a device according to the invention with the features of claim 10.

The fact that both planar side walls of the wedge-shaped shear blades are aligned at an acute angle to one another and converge in the direction of the shaft receptacle and that the wedge-shaped shear blades are inclined away from the shaft receptacle in the sense that, when the rotor is operated as intended, the face sides of these shear blades are forward in the flow direction, on the one hand, there is a pronounced shear region on the wedge-shaped shear blades radially on the inside, which shear region is designed in particular as a sharp face edge, for good mixing behavior, and on the other hand, a side wall situated at the rear in the flow direction for continuous operation that is as trouble-free as possible, which side wall avoids or at least reduces flows to the planar side wall at the front in the flow direction and disturbing deposits or adherent accumulations.

Further expedient refinements of the invention are the subject matter of the dependent claims.

Further useful embodiments and advantages of the invention emerge from the following description of embodiments of the invention with reference to the figures of the drawing.

DESCRIPTION OF EMBODIMENTS OF THE INVENTION

Figure 1:
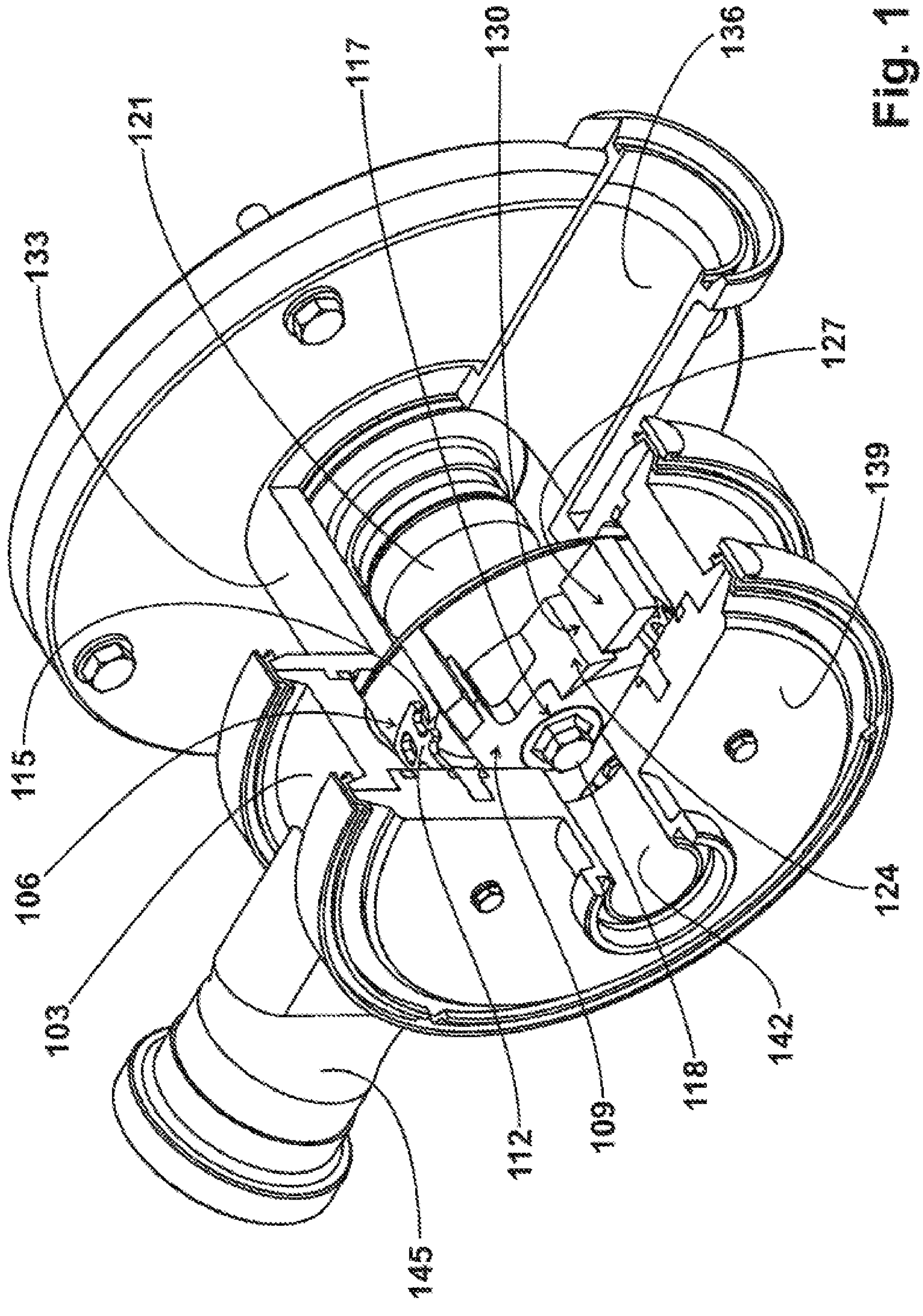
FIG. 1 is a perspective, partially sectioned view of an embodiment of a device according to the invention with an embodiment of a rotor according to the invention.

FIG. 1 is a perspective, partially sectioned view of an embodiment of a device for mixing powder and liquid according to the invention. The embodiment according to FIG. 1 is equipped with a process chamber housing 103 in which a stator 106, which is fixed with respect to the process chamber housing 103, and a rotor 109, which can rotate with respect to the stator 106, are arranged.

The stator 106 has a circumferentially closed, cylinder-like annular wall 112 which is formed with mixing passage recesses 115.

The rotor 109 is connected to a motor-driven drive shaft 121 via a rotor fastening screw 118 arranged in the region of a centrally located shaft receptacle 117. The rotor 109 has a number of shear blades 124 which are situated radially on the inside and a number of outer blades 127 which are situated radially on the outside and extend in each case approximately in the axial direction and between which an annular wall receiving gap 130 is formed, into which, when the stator 106 and the rotor 109 are arranged as intended, the ring wall 112 is inserted.

Furthermore, it can be seen from FIG. 1 that the drive shaft 121 is surrounded in portions by a liquid supply chamber housing 133, which is tightly flanged to the process chamber housing 103 and is designed with a radially aligned liquid supply connector 136. When the liquid supply connector 136 is connected to a liquid supply line (not shown in FIG. 1), liquid can be supplied into the process chamber housing 103 on the side facing away from the shear blades 124.

On the side facing away from the liquid supply chamber housing 133, a process chamber cover 139 is flanged to the process chamber housing 103, which is formed with an axially aligned powder supply connector 142. When the powder supply connector 142 is connected to a powder supply line (not shown in FIG. 1), powder can be supplied to the process chamber housing 103 on the side facing the shear blades 124.

The process chamber housing 103 is in turn formed with a radially aligned mixture outlet connection 145, via which the mixture of powder and liquid formed in the process chamber housing 103 can be discharged via a mixture discharge line (not shown in FIG. 1) with the interaction of the stator 106 and the rotor 109.

Figure 2:
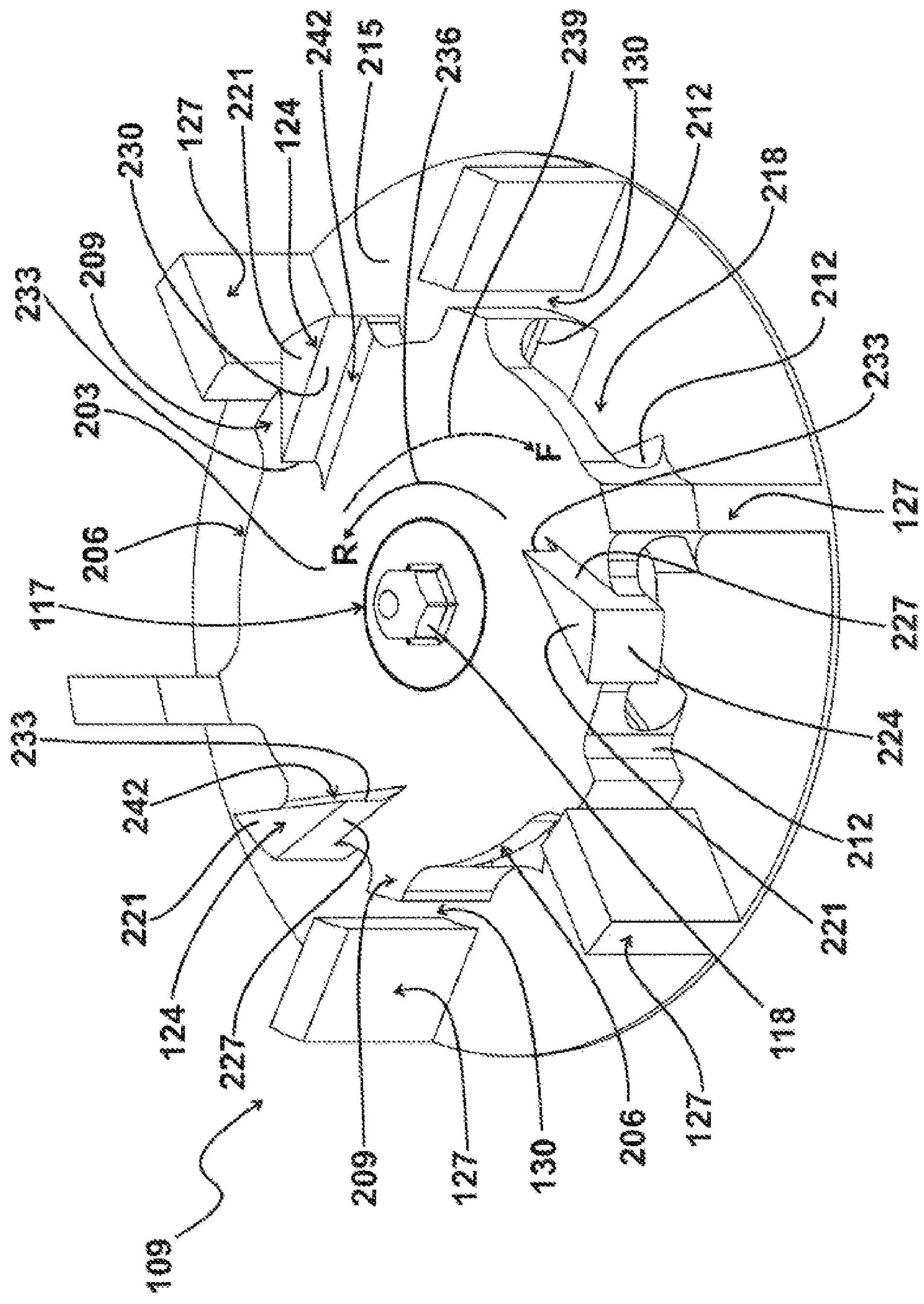
FIG. 2 is a perspective view of an embodiment of a rotor according to the invention.

FIG. 2 shows a perspective view of an embodiment of a rotor 109 according to the invention, which can be used in a device according to the invention and in particular in a corresponding embodiment according to FIG. 1. The embodiment of a rotor 109 according to the invention shown in FIG. 2 has, in addition to the elements already explained in connection with FIG. 1, as a support structure, a substantially circular support disk 203, the rotor fastening screw 118 being arranged in the middle region of the disk and the shear blades 124 being formed radially on the outside thereon and extending away from the support disk 203 in an axial direction.

The support disk 203 is provided on its radial outside with a number of radially inwardly extending liquid outlet recesses 206 which each extend over the same angular sections and are regularly distributed over the circumference of the support disk 203. Radial projections 209, which are situated in each case opposite an outer blade 127, remain between the liquid outlet recesses 206.

In the region of the radial projections 209, on the side opposite the shear blades 124, connecting webs 212 extending in the axial direction are formed on the support disk 203, on the ends of which an outer blade support plate 215 is formed facing away from the support disk 203. The outer blade support plate 215 has the shape of a circular ring and is arranged in a plane that is axially parallel and offset with respect to the support disk 203, so that a liquid passage channel 218 is formed between adjacent connecting webs 212.

The outer blade support plate 215 carries the outer blades 127, which are substantially cuboid, extend with the long sides thereof in the radial direction and in the axial direction from the outer blade support plate 215 into the plane, in which the upper sides 221 of the shear blades 124 facing away from the support disk 203 are situated.

In this embodiment according to the invention, the shear blades 124 are designed in each case in the basic shape of an acute-angled triangular wedge, the tip region of which points radially inward. A radially outwardly facing end wall 224 of each wedge-shaped shear blade 124 is rounded off with a radius corresponding to the circumference of the support disk 203. Side walls 227, 230 of each shear blade 124 of this type are planar and converge at an acute angle to a sharp face edge 233 extending in the axial direction as the face side.

As can be seen from FIG. 2, the wedge-shaped shear blades 124 are inclined in relation to the radial direction in such a way that the face edges 233 are situated at the front during mixing, as intended in a direction of rotation R of the rotor 109, indicated by a solid arrow 236, in relation to a main component indicated by dashed arrows 239, of the direction of rotation R supplemented by a radial component in the opposite flow direction F.

This results in an effective rear flow of the flow dynamically on the leeward side, i.e. on the rear side wall 230 with laminar proportions on the rear side in relation to a main flow direction, and thus a reduction in the risk of disruptive deposits and adherent accumulations on the rear side wall 230.

To further reduce the risk of disruptive deposits and adherent accumulations on the rear side wall 230 and for an effective diversion of the mixture of powder and liquid when performing a mixing process in the direction of the annular wall 112, it is useful that the front side wall 227 in the flow direction F with the diameter running through the face edge 233 is aligned more inclined than the rear side wall 230 in the flow direction F.

To further improve the deposit resistance and resistance to adherent accumulations, the transition from the rear side wall 230 to the support disk 203 is rounded in a transition region 242.

In the embodiment illustrated in FIG. 2, the wedge-shaped shear blades 124 are situated in the circumferential direction between the connecting webs 212 and thus between the outer blades 127, and into the liquid outlet recesses 206 protruding radially outward over the liquid passage channels 218. This results in a relatively high powder suction rate due to the arrangement of the wedge-shaped shear blades 124 downstream of the outer blades 127 in the direction of rotation R of the rotor 109.

Figure 3:
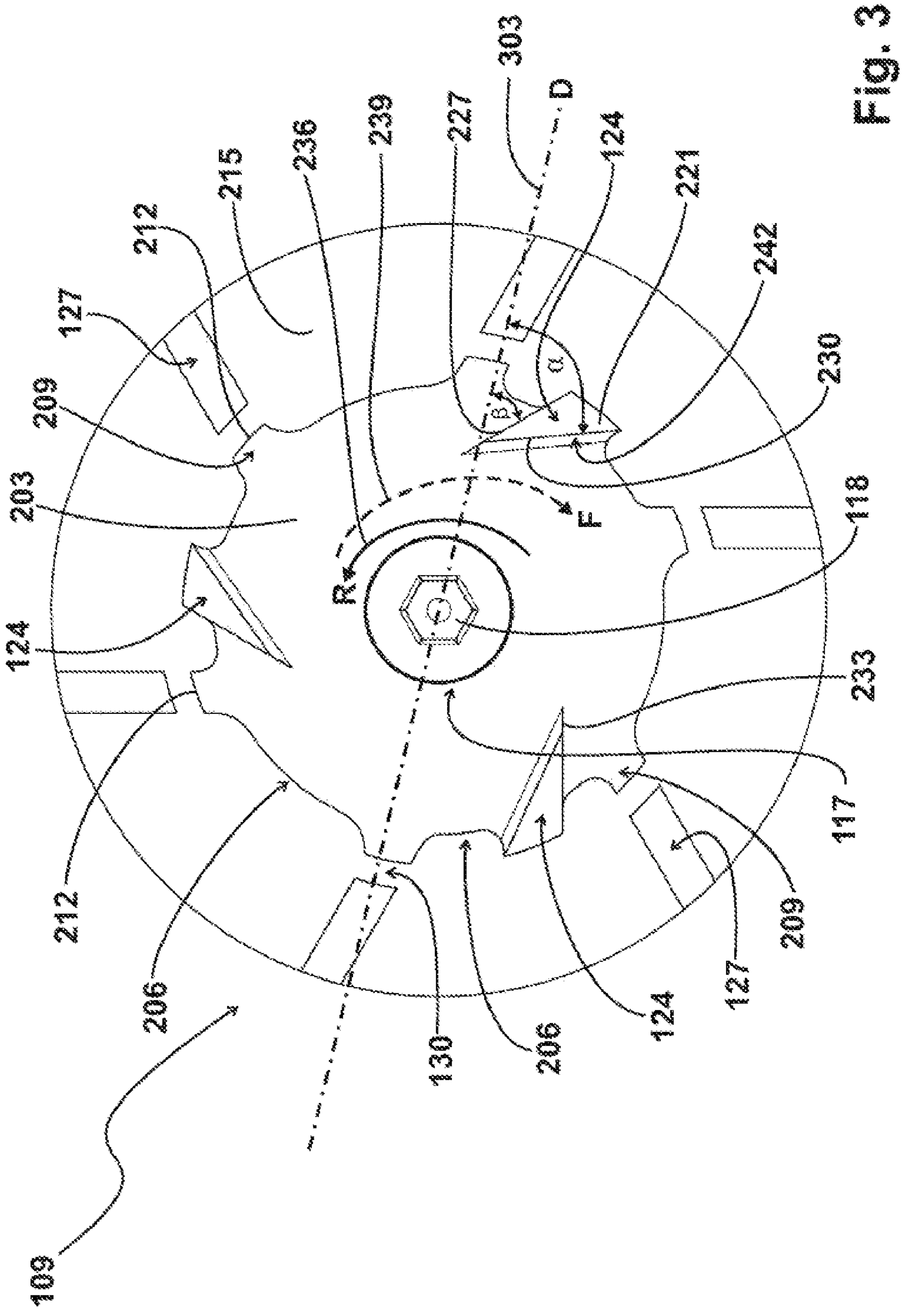
FIG. 3 is a top view of the embodiment of the rotor according to FIG. 2.

FIG. 3 is a top view of the embodiment of a rotor 109 according to the invention shown in FIG. 2. FIG. 3 shows that the wedge-shaped shear blades 124 are inclined with the face edge 233 in the direction of rotation R and at the front in relation to the flow direction F, so that the side wall 230 located at the rear in the flow direction F is based on the diameter D shown by a dash-dotted line 303 of the support disk 203 through the shaft receptacle 117 and through the face edge 233 at a relatively large angle α, for example approximately at right angles, while the front side wall 227 in the flow direction F is inclined obliquely to this diameter D of the support disk 203 and thus more inclined against the flow direction F at an angle ß which is smaller than the angle α.

This results in an effective diversion radially outward at the front side wall 227 for the mixture of powder and liquid to pass through the mixing passage recesses 115 of the annular wall 112 of the stator 106 and thus a very effective mixing behavior, while the flow along the rear side wall 230 has a not insignificant proportion of laminar components, which help to avoid or reduce deposits and adherent accumulations in this region.

Figure 4:
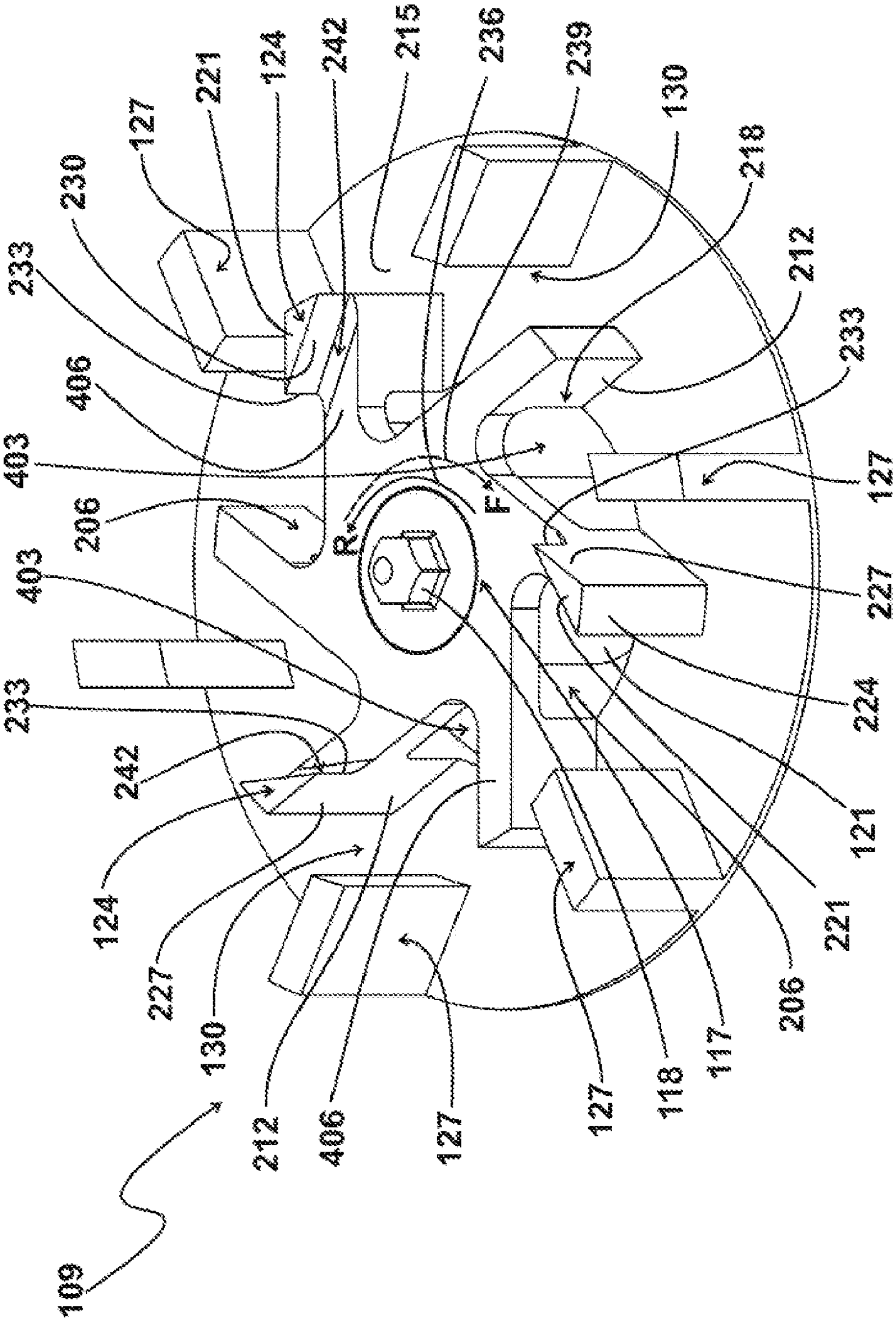
FIG. 4 is a perspective view of another embodiment of a rotor according to the invention.

FIG. 4 shows a perspective view of a further embodiment of a rotor 109 according to the invention, corresponding elements being provided with the same reference signs and not being explained again in more detail below in the case of the embodiment of rotors 109 according to the invention shown in FIG. 2 and FIG. 3 and the embodiment of a rotor 109 shown in FIG. 4 according to the invention. In the embodiment of a rotor 109 according to the invention shown in FIG. 4, compared to the embodiment of a rotor 109 according to the invention shown in FIG. 2 and FIG. 3, the radially outwardly provided liquid outlet recesses 206 are deepened radially inward to such an extent that a direct liquid passage region 403 is created in the axial direction from the side of the drive shaft 121 to the other side of the support structure designed as support arms 406.

This results in an increased liquid passage rate compared to the embodiment of a rotor 109 according to the invention explained with reference to FIGS. 2 and 3.

Figure 5:
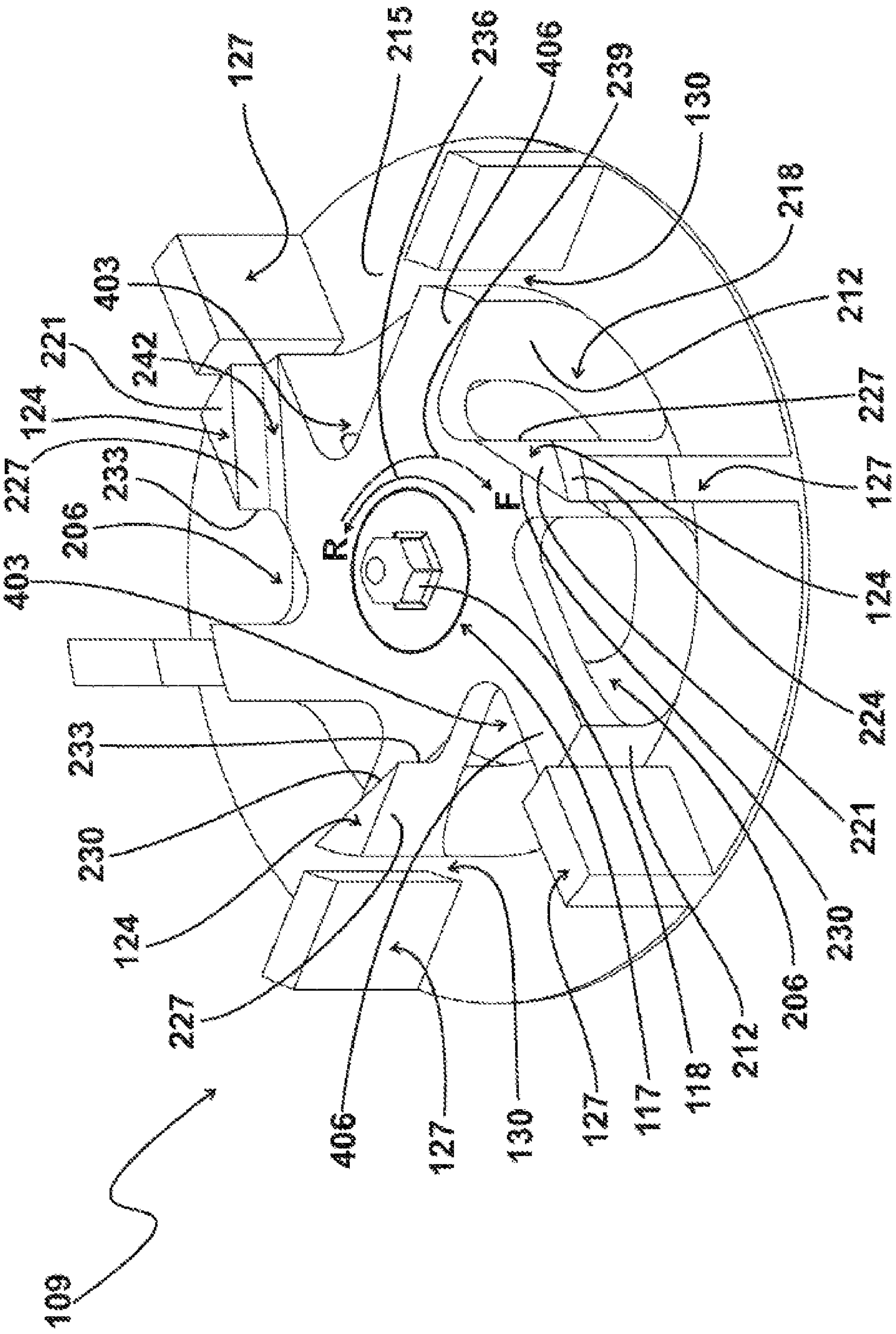
FIG. 5 is a perspective view of another embodiment of a rotor according to the invention.

FIG. 5 shows a perspective view of a further embodiment of a rotor 109 according to the invention, corresponding elements being provided with the same reference signs and not being explained in more detail below in the case of the embodiments of rotors 109 according to the invention explained with reference to FIGS. 2, 3, and 4 and the embodiment of a rotor 109 explained with reference to FIG. 5 according to the invention.

The embodiment of a rotor 109 according to the invention explained with reference to FIG. 5 is modified from the embodiment of a rotor 109 according to the invention explained with reference to FIG. 4 in that the wedge-shaped shear blades 124 are directly opposite the outer blades 127 in the radial direction. As a result, compared to the embodiment of a rotor 109 according to the invention explained with reference to FIG. 4, the shear action is increased in the embodiment of a rotor 109 according to the invention explained with reference to FIG. 5.

The embodiments of rotors 109 according to the invention explained with reference to FIGS. 2 to 5 have a ratio of wedge-shaped shear blades 124 to outer blades 127 of 1:2. This results in a good mix of powder and liquid for many operating conditions. It goes without saying, however, that other ratios of wedge-shaped shear blades 124 to outer blades 127 can also be provided for specific operating conditions.

The invention claimed is:

1. Rotor for a device for mixing powder and liquid comprising a support structure which is formed with a shaft receptacle arranged in a central region, comprising a plurality of shear blades which extend in an axial direction and which are formed on the support structure and are arranged at a radial distance from the shaft receptacle and extend away from the support structure in the axial direction, wherein at least some of the plurality of shear blades have at least two side walls each extending in a direction of a central region of the support structure, which are designed in a wedge-shaped acute angle to one another and which converge radially inward, wherein the wedge-shaped shear blades are inclined with face sides pointing radially inwardly away from the shaft receptacle, characterized in that the shear blades are designed in a basic shape of an acute-angled triangular wedge with two flat side walls which run toward one an-other at an acute angle to a sharp face edge pointing in the direction of the central region and extending in the axial direction, wherein a radially outwardly facing end wall of each wedge-shaped shear blade is rounded off with a radius corresponding to the circumference of a support disk, and wherein the wedge-shaped blades are inclined in relation to the radial direction in such a way that, in the case of a direction of rotation of the rotor as intended, the front edges are situated at the front with respect to an opposite flow direction during mixing.

2. Rotor according to claim 1, characterized in that a front side wall in one flow direction when mixing powder and liquid is more inclined than a rear side wall in the flow direction in the case of the wedge-shaped shear blades.

3. Rotor according to claim 1, characterized in that a transition region of the rear side wall to the support structure is rounded in the case of at least some wedge-shaped shear blades.

4. Rotor according to claim 1, characterized in that the support structure has edge recesses projecting radially inward in the region of the wedge-shaped shear blades.

5. Rotor according to claim 4, characterized in that wedge-shaped shear blades (124) are arranged between the edge sides of edge recesses.

6. Rotor according to claim 1, characterized in that a plurality of connecting webs are formed on the support structure on the side facing away from the wedge-shaped shear blades, in that an outer blade support plate is formed on the support structure facing away from the ends of the connecting webs, which outer blade support plate extends in the radial direction over the support structure, and in that outer blades are present, which are formed on the outer blade support plate.

7. Rotor according to claim 6, characterized in that the connecting webs and the outer blades are arranged opposite one another in the radial direction.

8. Rotor according to claim 7, characterized in that connecting webs and wedge-shaped shear blades merge into one another in the axial direction.

9. Rotor according to claim 6, characterized in that the connecting webs and the outer blades are offset from one another in the circumferential direction, and in that the connecting webs and wedge-shaped shear blades merge into one another in the axial direction.

10. Device for mixing powder and liquid, with a stator formed with an annular wall, and with a rotor comprising a support structure which is formed with a shaft receptacle arranged in a central region, comprising a plurality of shear blades which extend in an axial direction and which are formed on the support structure and are arranged at a radial distance from the shaft receptacle and extend away from the support structure in the axial direction, wherein at least some shear blades have at least two side walls each extending in a direction of the central region of the support structure, which are designed in a wedge-shaped acute angle to one another and which converge radially inward, wherein the wedge-shaped shear blades are inclined with face sides pointing radially inwardly away from the shaft receptacle, characterized in that the shear blades are designed in a basic shape of an acute-angled triangular wedge with two flat side walls which run toward one another at an acute angle to a sharp face edge pointing in the direction of the central region and extending in the axial direction, wherein a radially outwardly facing end wall of each wedge-shaped shear blade is rounded off with a radius corresponding to the circumference of a support disk, and wherein the wedge-shaped blades are inclined in relation to the radial direction in such a way that, in the case of a direction of rotation of the rotor as intended, the front edges are situated at the front with respect to an opposite flow direction during mixing, wherein the wedge-shaped shear blades of the rotor are arranged radially on the inside of the annular wall of the stator.

11. Device according to claim 10, characterized in that the powder and liquid are supplied on different sides of the support structure.

12. Device according to claim 10, wherein the rotor is characterized in that a front side wall in one flow direction when mixing powder and liquid is more inclined than a rear side wall in the flow direction in the case of the wedge-shaped shear blades.

13. Device according to claim 10, wherein the rotor is characterized in that a transition region of the rear side wall to the support structure is rounded in the case of at least some wedge-shaped shear blades.

14. Device according to claim 10, wherein the rotor is characterized in that the support structure has edge recesses projecting radially inward in the region of the wedge-shaped shear blades.

15. Device according to claim 14, wherein the rotor is characterized in that wedge-shaped shear blades are arranged between the edge sides of the edge recesses.

16. Device according to claim 10, wherein the rotor is characterized in that a plurality of connecting webs are formed on the support structure on the side facing away from the wedge-shaped shear blades, in that an outer blade support plate is formed on the support structure facing away from the ends of the connecting webs, which outer blade support plate extends in the radial direction over the support structure, and in that outer blades are present, which are formed on the outer blade support plate.

17. Device according to claim 16, wherein the rotor is characterized in that the connecting webs and the outer blades are arranged opposite one another in the radial direction.

18. Device according to claim 17, wherein the rotor is characterized in that connecting webs and wedge-shaped shear blades merge into one another in the axial direction.

19. Device according to claim 16, wherein the rotor is characterized in that the connecting webs and the outer blades are offset from one another in the circumferential direction, and in that the connecting webs and wedge-shaped shear blades merge into one another in the axial direction.

* * * * *